(12) United States Patent
Kurosaki

(10) Patent No.: US 11,155,964 B2
(45) Date of Patent: Oct. 26, 2021

(54) PAPER ROLL PRODUCTION APPARATUS

(71) Applicant: CORELEX SHIN-EI CO., LTD., Fuji (JP)

(72) Inventor: Satoshi Kurosaki, Fuji (JP)

(73) Assignee: CORELEX SHIN-EI CO., LTD., Fuji (JP)

(*) Notice: Subject to any disclaimer, the term of this patent is extended or adjusted under 35 U.S.C. 154(b) by 0 days.

(21) Appl. No.: 16/962,133

(22) PCT Filed: Mar. 19, 2018

(86) PCT No.: PCT/JP2018/010885
§ 371 (c)(1),
(2) Date: Jul. 14, 2020

(87) PCT Pub. No.: WO2019/180790
PCT Pub. Date: Sep. 26, 2019

(65) Prior Publication Data
US 2020/0407915 A1    Dec. 31, 2020

(51) Int. Cl.
*D21F 9/00* (2006.01)
*B65H 18/08* (2006.01)

(52) U.S. Cl.
CPC ............ *D21F 9/003* (2013.01); *B65H 18/08* (2013.01)

(58) Field of Classification Search
CPC ........... D21F 9/003; D21F 9/00; B65H 18/08; D21H 27/00
See application file for complete search history.

(56) References Cited

U.S. PATENT DOCUMENTS 5,556,513 A * 9/1996 Shimazu ............... D21F 11/04
162/304
5,607,555 A * 3/1997 Grossmann ............. D21F 9/003
162/133
(Continued)

FOREIGN PATENT DOCUMENTS

JP      05-125688 A      5/1993
JP      05125688 A  *   5/1993
(Continued)

OTHER PUBLICATIONS

International Search Report for PCT/JP2018/010885 dated Jun. 5, 2018 [PCT/ISA/210].

*Primary Examiner* — Eric Hug
*Assistant Examiner* — Matthew M Eslami
(74) *Attorney, Agent, or Firm* — Sughrue Mion, PLLC

(57) ABSTRACT

Provided is a paper roll production apparatus that saves installation space and enables production of paper rolls of different qualities and a shortening of production time. The paper roll production apparatus includes: a sheet-forming and dewatering part 5 forming paper stock into a sheet and for dewatering the paper stock; a drying machine 6 drying the paper stock dewatered by the sheet-forming and dewatering part 5 to form a dry paper material; a switching mechanism part switching to feed, into the drying machine 6, the paper stock dewatered by a first sheet-forming machine included in the sheet-forming and dewatering part 5 or the paper stock dewatered by a second sheet-forming machine included in the sheet-forming and dewatering part 5; and a winder 8 winding up the dry paper material provided by the drying machine 6 to form a paper roll. The first sheet-forming machine operates at a sheet-forming speed at which a fiber orientation of the paper stock is maintained. The second sheet-forming machine operates at a sheet-forming speed faster than the sheet-forming speed of (Continued)

the first sheet-forming machine. The winder 8 winds up the dry paper material at a speed corresponding to the sheet-forming speed of the first sheet-forming machine or to the sheet-forming speed of the second sheet-forming machine to form the paper roll material.

2 Claims, 2 Drawing Sheets

(56) References Cited

U.S. PATENT DOCUMENTS

| | | | |
|---|---|---|---|
| 5,609,726 | A | 3/1997 | Sollinger |
| 6,342,125 | B1 | 1/2002 | Nordstrom |
| 2011/0297342 | A1 | 12/2011 | Nordstrom |

FOREIGN PATENT DOCUMENTS

| | | | | |
|---|---|---|---|---|
| JP | 06-264389 | A | | 9/1994 |
| JP | 07-138893 | A | | 5/1995 |
| JP | 07-138895 | A | | 5/1995 |
| JP | 07-258991 | A | | 10/1995 |
| JP | 2001-515153 | A | | 9/2001 |
| JP | 2002-124242 | A | | 4/2002 |
| JP | 2002124242 | A | * | 4/2002 |
| JP | 2012-518101 | A | | 8/2012 |
| JP | 5288480 | B2 | | 9/2013 |
| JP | 2016-141890 | A | | 8/2016 |
| JP | 2016141890 | A | * | 8/2016 |
| WO | 2015/173474 | A1 | | 11/2015 |
| WO | WO-2015173474 | A1 | * | 11/2015 ............. D21F 9/006 |

\* cited by examiner

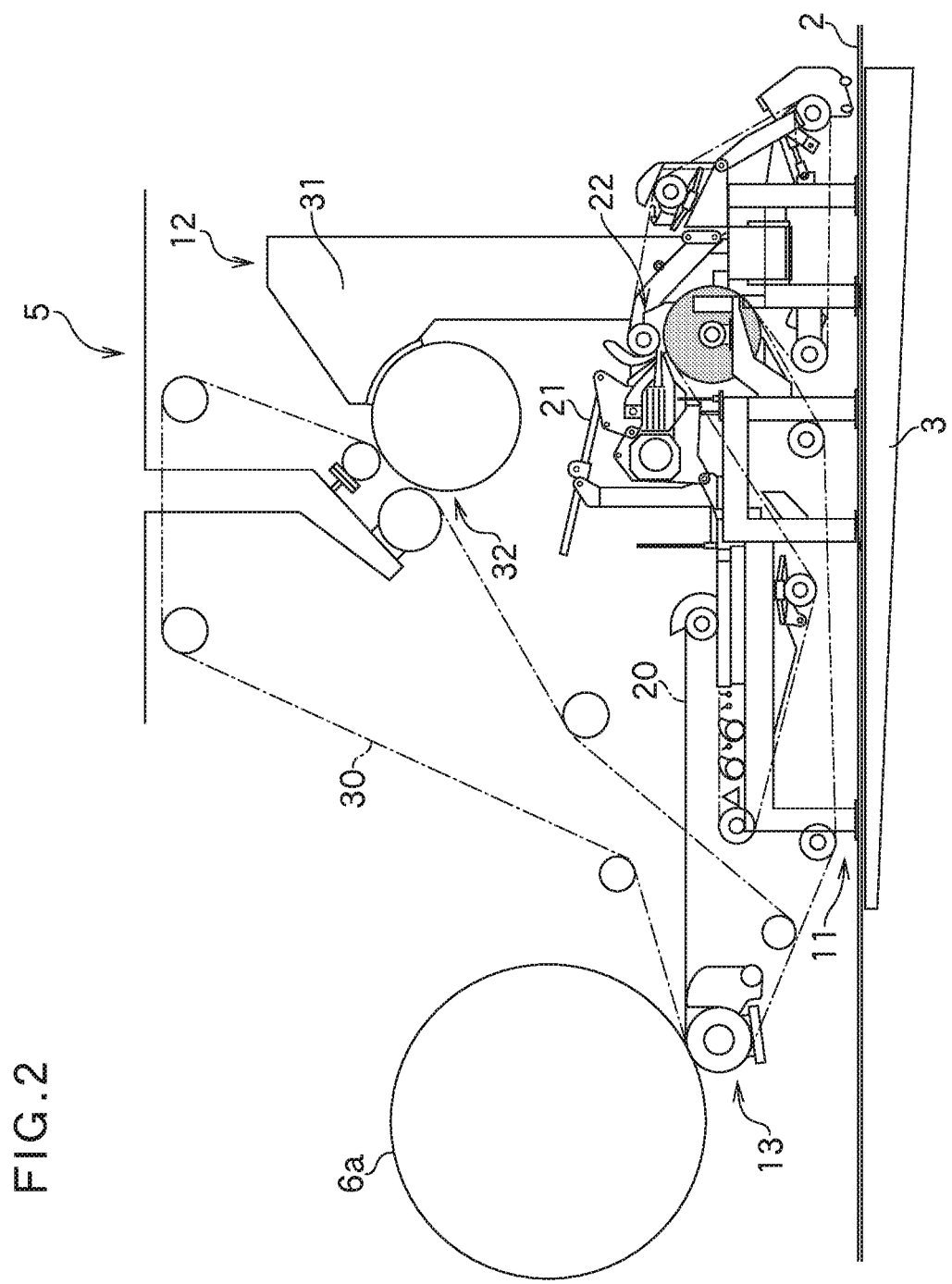

PAPER ROLL PRODUCTION APPARATUS

CROSS REFERENCE TO RELATED APPLICATIONS

This application is a National Stage of International Application No. PCT/JP2018/010885 filed Mar. 19, 2018.

TECHNICAL FIELD

The present invention relates to a paper roll production apparatus for use in production of large paper rolls.

BACKGROUND ART

Producing recycled paper by using wastepaper may involve the following. The wastepaper is transformed into pulp, which is then defibrated in water to obtain, for example, white water. Subsequently, paper stock is strained from the white water with a fourdrinier wire screen or a cylinder wire screen and undergoes a dewatering process and a drying process. Consequently, large paper rolls having, for example, a desired degree of flexibility and a desired degree of strength are produced (see, for example, PTL 1).

The production time per roll is particularly longer for large paper rolls such as parent rolls. It is thus desired that each production process be conducted as fast as possible. A suction former or the like speedily conducts sheet forming and dewatering processes, and some other apparatuses speed up the subsequent processes such as drying and roll-winding processes have been developed.

CITATION LIST

Patent Literature

PTL 1: Japanese Patent No. 5288480

SUMMARY OF INVENTION

Technical Problem

The aforementioned sheet forming needs to be performed in such a manner as to produce soft-touch paper with a desired degree of strength, which may be achieved through, for example, a uniform fiber orientation. It is thus required that the paper stock strained with, for example, a cylinder wire screen be formed into a sheet and be dried in such a manner as to have, for example, a uniform fiber orientation. Thus, a suction former designed to operate at a relatively low speed is used in a production apparatus.

Alternatively, a suction former capable of operating at a high speed may be used to shorten the production time for large paper rolls. In this case, paper fibers may be in random orientations at the time of removal of water, and flexibility of the resultant paper under dry conditions may be hampered.

Thus, producing paper in large quantity and in the shortest possible time requires the use of, for example, different suction formers for different intended paper qualities. Thus, different production apparatuses having different configurations are to be installed. This will result in increases in the cost of installation and maintenance, and a considerable amount of installation space is necessary.

The present invention has been made in view of these problems, and it is an object of the present invention to provide a paper roll production apparatus that saves installation space and enables production of paper rolls of different qualities and a shortening of production time.

Solution to Problem

A paper roll production apparatus according to the present invention includes: a first sheet-forming machine and a second sheet-forming machine for forming paper stock into a sheet and for dewatering the paper stock; a drying machine for dying the paper stock dewatered by the first or second sheet-forming machine to from a dry paper material; a switching mechanism part for switching to feed, into the drying machine, the paper stock dewatered by the first sheet-forming machine or the paper stock dewatered by the second sheet-forming machine; and
a winder for winding up the dry paper material provided by the drying machine to form a paper roll. The first sheet-forming machine operates at a sheet-forming speed at which a fiber orientation of the paper stock is maintained. The second sheet-forming machine operates at a sheet-forming speed faster than the sheet-forming speed of the first sheet-forming machine. The winder winds up the dry paper material at a speed corresponding to the sheet-forming speed of the first sheet-forming machine or to the sheet-forming speed of the second sheet-forming machine to form the paper roll.

The second sheet-forming machine includes: a suction former operating at a sheet-forming speed faster than the sheet-forming speed of the first sheet-forming machine; and a conveyor part for conveying, to the drying machine, paper stock dewatered by the suction former. The second sheet-forming machine is disposed above the first sheet-forming machine with a difference in elevation between the first and second sheet-forming machines, the difference being provided to remove, from the paper stock, water in an amount corresponding to the sheet-forming speed of the suction former when the conveyor part conveys the paper stock dewatered by the suction former.

Advantageous Effects of Invention

According to the present invention, large paper rolls are produced in such a manner that the choice of which suction former to use may be determined in accordance with the intended paper quality. The present invention thus saves installation space and reduces production time to the maximum extent possible.

BRIEF DESCRIPTION OF DRAWINGS

FIG. 2 illustrates a schematic configuration of a sheet-forming and dewatering part of the paper roll production apparatus illustrated in FIG. 1.

DESCRIPTION OF EMBODIMENTS

Figure 1:
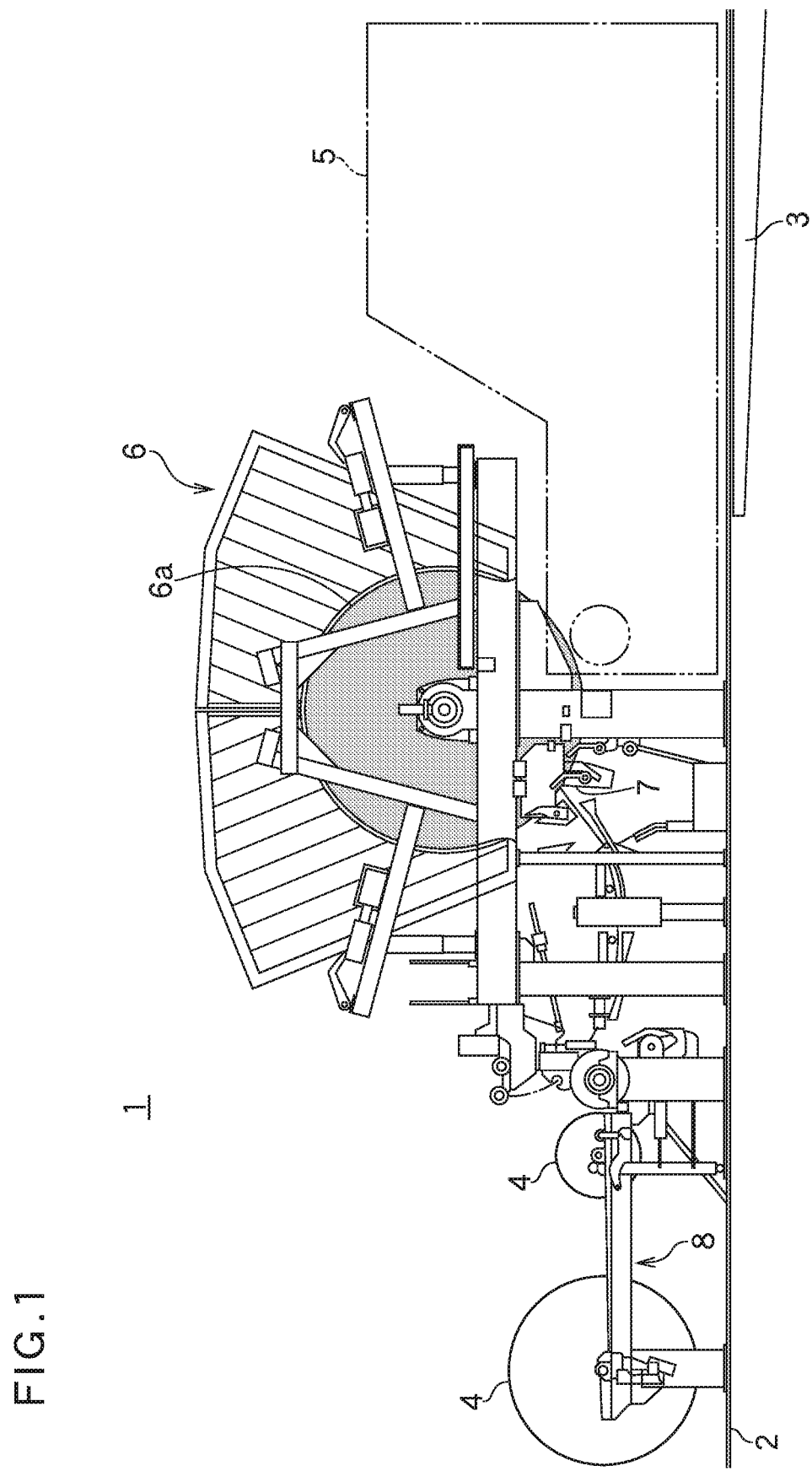
FIG. 1 illustrates a schematic configuration of a paper roll production apparatus according to an example of the present invention.

The following describes, with reference to the accompanying drawings, an example that is an embodiment of the present invention.

EXAMPLE

FIG. 1 illustrates a schematic configuration of a paper roll production apparatus according to an example of the present invention. This illustrates the configuration of a production apparatus 1, which produces large paper rolls such as parent rolls from pulp containing, for example, wastepaper dissolved therein. A device for transforming, for example, wastepaper into pulp, a device for defibrating the pulp in water to generate white water, and a device or equipment for feeding the white water into a sheet-forming and dewatering part 5 are not illustrated in the drawing.

The production apparatus 1 is installed in a building of, for example, a plant and is fixed to a floor surface 2 of the building. The production apparatus 1 includes: the sheet-forming and dewatering part 5, which draws paper stock from white water and dewaters the paper stock; a drying machine 6, which dries the paper stock dewatered by the sheet-forming and dewatering part 5; and a winder 8, which forms, for example, a parent roll 4 by winding up the paper material dried by the drying machine 6.

Part of the floor surface 2 located below the sheet-forming and dewatering part 5 has a drainage trench 3, through which droplets of water removed during the sheet forming or dewatering process are transported to a predetermined site.

The drying machine 6 includes a Yankee dryer 6a which sticks the paper stock coming out of the sheet-forming and dewatering part 5 on the surface of the Yankee dryer 6a. A doctor 7 is disposed on a lower end portion of the Yankee dryer 6a to scrape the paper material sticking on the surface of the Yankee dryer 6a. The production apparatus 1 also includes a conveyor that conveys the paper material scraped by the doctor 8 to the winder 8.

FIG. 2 illustrates a schematic configuration of the sheet-forming and dewatering part of the paper roll production apparatus illustrated in FIG. 1. The sheet-forming and dewatering part 5 illustrated in FIG. 2 includes: a first sheet-forming machine 11 having a suction former 22 for low-speed dewatering; and a second sheet-forming machine 12 having a suction former 32 for high-speed dewatering. The sheet-forming and dewatering part 5 also includes a switching mechanism part 13 having a++ touch roll in contact with, for example, a lower portion of the Yankee dryer 6a.

The sheet-forming and dewatering part 5 is provided in such a manner that the first sheet-forming machine 11 is fixedly installed on the floor surface 2 and the second sheet-forming machine 12 is fixedly installed above the first sheet-forming machine 11 with a frame member or a mounting member (not illustrated).

The first sheet-forming machine 11 is configured to lay, on a first transfer felt 20, paper stock drawn by the suction former 22. The first transfer felt 20 is supported by, for example, a plurality of rollers in such a manner as to move circularly between the touch roll of the switching mechanism part 13 and the suction former 22. The first transfer felt 20 is installed in such a manner as to be connected to (in contact with), for example, a drive unit (not illustrated) that causes the first transfer felt 20 to move circularly as described above.

The second sheet-forming machine 12 is configured to lay, on a second transfer felt 30, paper stock drawn by the suction former 32. The second transfer felt 30 is supported by, for example, a plurality of rollers in such a manner as to move circularly between the touch roll of the switching mechanism part 13 and the suction former 32. The second transfer felt 30 is installed in such a manner as to be connected to (in contact with), for example, a drive unit (not illustrated) that causes the second transfer felt 30 to move circularly as described above.

The switching mechanism part 13 is provided so that the paper stock laid on the first transfer felt 20 or the paper stock laid on the second transfer felt 30 is stuck to the Yankee dryer 6a. For example, the switching mechanism part 13 is configured to change the first transfer felt 20 and the second transfer felt 30 to let either of these transfer felts to contact the touch roll such that either of these transfer felts comes into contact with the Yankee dryer 6a to stick the dewatered paper stock on the surface of the Yankee dryer 6a.

The second sheet-forming machine 12 is disposed above the first sheet-forming machine 11. Thus, the second transfer felt 30 moves at higher elevations than the first transfer felt 20. The second transfer felt 30 is provided in such a manner as to have a steep gradient and to move circularly between sites with a large difference in elevation.

Specifically, the second transfer felt 30 is provided and configured as follows. The second transfer felt 30 moves circularly between the touch roll of the switching mechanism part 13 and the suction former 32 disposed at an elevation higher than the elevation at which the touch roll is disposed. Owing to, for example, the high elevation and the given gradient of the second transfer felt 30, the paper stock laid on the second transfer felt 30 is dewatered with a high degree of efficiency, or water squeezed out from the paper stock drains downward.

The first transfer felt 20 and the second transfer felt 30 are supported by, for example, the rollers as described above. Paths on which the corresponding transfer felts move provide press parts that dewater paper stock formed into a sheet or extract water from the paper stock under pressure.

The first sheet-forming machine 11, which operates at a low sheet-forming speed, is configured as follows. At a headbox 21, paper stock formed into a sheet in, for example, a wire part is laid on the first transfer felt 20. The paper stock is then brought into contact with, for example, a press roll of the suction former 22 adjacent to the headbox 21, where the paper stock on the first transfer felt 20 is dewatered or undergoes water extraction under pressure. Consequently, most of water is removed from the paper stock.

The second sheet-forming machine 12, which operates at a high sheet-forming speed, is configured as follows. At a headbox 31, paper stock formed into a sheet is laid on the second transfer felt 30. The paper stock is then brought into contact with, for example, a press roll of the suction former 32 adjacent to the headbox 31, where the paper stock on the second transfer felt 30 is dewatered or undergoes water extraction under pressure.

The first sheet-forming machine 11 operates at a sheet-forming speed of, for example, 900 (m/min) or lower. The second sheet-forming machine 12 operates at a sheet-forming speed of, for example, 1,800 (m/min) or higher.

The sheet forming and dewatering at the headbox 31 is conducted in such a manner as to enable the second sheet-forming machine 12 to achieve a given sheet-forming speed. When the sheet-forming speed is higher, it is more difficult to take enough time to dewater paper stock.

As illustrated in, for example, FIG. 2, the second sheet-forming machine 12 of the production apparatus 1 is disposed above the first sheet-forming machine 11 of the production apparatus 1.

Thus, the headbox 31 and the suction former 32 may be disposed at high elevations and may be sparsely surrounded by other structures accordingly. When the paper stock drawn from white water is dewatered, water droplets squeezed out from the paper stock can be spattered in an efficient manner.

The second transfer felt 30 is disposed between the suction former 32 at a high elevation and the drying machine 6 at a low elevation or between the suction former 32 and the switching mechanism part 13 and is inclined or has a difference in elevation between the highest and lowest points accordingly.

When paper stock is laid on the second transfer felt 30 and is conveyed along, for example, the inclined part, water contained in the paper stock drains downward. That is, moisture in the paper stock dewatered by, for example, the suction former 32 may be further reduced.

The second sheet-forming machine 12, which operates at a high sheet-forming speed, is disposed at a high elevation with a predetermined difference in elevation between the first sheet-forming machine 11 and the second-sheet-forming machine 12. Owing to this configuration of the production apparatus 1, paper stock that is to be conveyed to the drying machine 6 may be sufficiently dewatered during operation of the first sheet-forming machine 11 or the second sheet-forming machine 12, that is, during operation conducted at any sheet-forming speed.

The difference in elevation between the second sheet-forming machine 12 and the first sheet-forming machine 11 is set in accordance with the sheet-forming speed of the second sheet-forming machine 12 or the sheet-forming speed of the suction former 32. In light of the fact that the dewatering time of, for example, the suction former 32 decreases with increasing sheet-forming speed, the suction former 32 is disposed at an elevation high enough to be sparsely surrounded by other structures, and water droplets can be spattered in an efficient manner accordingly. The second transfer felt 30, which conveys the paper stock, is inclined or has a difference in elevation between the highest and lowest points so that a sufficient amount of water can be removed from the paper stock.

The drying machine 6 or the Yankee dryer 6a is configured to dry paper stock conveyed to the touch roll of the switching mechanism part 13. Specifically, paper stock formed into a sheet and dewatered by the first sheet-forming machine 11 or the second sheet-forming machine 12 is stuck on the surface of the Yankee dryer 6a, which is heated by, for example, a heater to dry the paper stock. That is, the drying machine 6 dries, under high temperature conditions, paper stock conveyed by the first transfer felt 20 or the second transfer felt 30, whichever is attached to the touch roll of the switching mechanism part 13.

The drying machine 6 is configured to operate at a drying speed corresponding to the sheet-forming speed of the first sheet-forming machine 11 or to the sheet-forming speed of the second sheet-forming machine 12. The Yankee dryer 6a is configured to operate at a rotation speed corresponding to the speed at which the first transfer felt 20 or the second transfer felt 30 moves.

When the moisture content of the paper stock dewatered by the first sheet-forming machine 11 differs from the moisture content of the paper stock dewatered by the second sheet-forming machine 12, the inner temperature of the drying machine 6 (the surface temperature of the Yankee dryer 6a) and the like may be adjusted in accordance with the dewatered state of the paper stock concerned.

The paper material dried by the Yankee dryer 6a is then scraped off the surface of the Yankee dryer 6a by the doctor 7 illustrated in FIG. 1 and is formed into wide paper. The production apparatus 1 causes the winder 8 to wind up the wide paper to form into the parent roll 4.

The winder 8 is configured to wind up wide paper at a speed corresponding to the speed at which the wide paper comes out of the Yankee dryer 6a. Specifically, the winder 8 is configured to operate in such a manner that a wide paper made of a paper material formed by the second sheet-forming machine 12 is wound up at a speed faster than the speed at which wide paper made of a paper material formed by the first sheet-forming machine 11 is wound up.

This configuration enables changing of the sheet-forming speed to produce paper rolls of desired paper qualities, and in particular, to produce large paper rolls in the shortest possible time. The production apparatus saves installation space.

The second sheet-forming machine 12, which operates at a high sheet-forming speed, is disposed above the first sheet-forming machine 11 with a predetermined difference in elevation between these sheet-forming machines. This configuration enables sufficient dewatering of paper stock irrespective of whether the first sheet-forming machine 11 or the second sheet-forming machine 12 is used.

REFERENCE SIGNS LIST

1 production apparatus
2 floor surface
3 drainage trench
4 parent roll
5 sheet-forming and dewatering part
6 drying machine
6a Yankee dryer
7 doctor
8 winder
11 first sheet-forming machine
12 second sheet-forming machine
13 switching mechanism part
20 first transfer felt
21 headbox
22 suction former
30 second transfer felt
31 headbox
32 suction former

The invention claimed is:

1. A paper roll production apparatus comprising:
a first sheet-forming machine and a second sheet-forming machine forming paper stock into a sheet and for dewatering the paper stock;
a drying machine drying the paper stock dewatered by the first or second sheet-forming machine to from a dry paper material;
a switching mechanism part switching to feed, into the drying machine, the paper stock dewatered by the first sheet-forming machine or the paper stock dewatered by the second sheet-forming machine; and
a winder winding up the dry paper material provided by the drying machine to form a paper roll, wherein
the first sheet-forming machine operates at a sheet-forming speed of 900 (m/min) or lower,
the second sheet-forming machine operates at a sheet-forming speed faster than the sheet-forming speed of the first sheet-forming machine, and
the winder winds up the dry paper material at a speed corresponding to the sheet-forming speed of the first sheet-forming machine or to the sheet-forming speed of the second sheet-forming machine to form the paper roll.

2. The paper roll production apparatus according to claim 1, wherein
the second sheet-forming machine includes:
a suction former disposed above the first sheet-forming machine with a difference in elevation between the suction former and the first sheet-forming machine; and a conveyor part that conveys paper stock dewatered by the suction former to the drying machine disposed at an elevation lower than an elevation at which the suction former is disposed.

* * * * *